United States Patent
Illi et al.

(10) Patent No.: US 10,286,342 B2
(45) Date of Patent: May 14, 2019

(54) FILTER PLATE, FILTER DISC APPARATUS, AND A METHOD FOR CONTROLLING A DISC FILTER

(71) Applicant: OUTOTEC (FINLAND) OY, Espoo (FI)

(72) Inventors: Mika Illi, Vantaa (FI); Antti Versala, Espoo (FI); Laura Simola, Turku (FI)

(73) Assignee: OUTOTEC (FINLAND) OY, Espoo (FI)

( * ) Notice: Subject to any disclaimer, the term of this patent is extended or adjusted under 35 U.S.C. 154(b) by 491 days.

(21) Appl. No.: 14/784,275

(22) PCT Filed: Apr. 17, 2013

(86) PCT No.: PCT/FI2013/050424
§ 371 (c)(1),
(2) Date: Oct. 13, 2015

(87) PCT Pub. No.: WO2014/170532
PCT Pub. Date: Oct. 23, 2014

(65) Prior Publication Data
US 2016/0074784 A1    Mar. 17, 2016

(51) Int. Cl.
*B01D 33/15* (2006.01)
*B01D 33/21* (2006.01)
(Continued)

(52) U.S. Cl.
CPC ......... *B01D 35/143* (2013.01); *B01D 29/002* (2013.01); *B01D 33/15* (2013.01);
(Continued)

(58) Field of Classification Search
CPC ...... B01D 35/143; B01D 33/15; B01D 33/21; B01D 33/23; B01D 2201/56; B01D 35/14;
(Continued)

(56) References Cited

U.S. PATENT DOCUMENTS 3,486,163 A * 12/1969 Dereymaeker ...... H01R 12/721
439/249
4,999,104 A * 3/1991 Krieger ................. B01D 33/15
210/196

(Continued)

FOREIGN PATENT DOCUMENTS

KR    20110020470 A    3/2011
WO    12012102662 A1    8/2012

OTHER PUBLICATIONS

PCT, International Preliminary Report on Patentability (Chapter II of the Patent Cooperation Treaty) for corresponding International Application No. PCT/FI2013/050424, dated Apr. 8, 2015, pp. 20.

*Primary Examiner* — Heidi R Kelley
*Assistant Examiner* — Angel Olivera
(74) *Attorney, Agent, or Firm* — Robert P. Michal, Esq.; Carter, DeLuca & Farrell LLP

(57) ABSTRACT

A ceramic filter plate (22) is provided with a conductive wiring (70, 71) extending along the filter plate to form a continuous electrical circuit and arranged to break upon breakage of the filter plate. The integrity of the conductive wiring (70, 71) is monitored, and the operation, particularly the rotation, of the disc filter is immediately stopped upon detecting a break of the conductive wiring.

17 Claims, 7 Drawing Sheets

(51) Int. Cl.
　　　*B01D 33/23*　　　(2006.01)
　　　*B01D 35/143*　　　(2006.01)
　　　*B01D 35/14*　　　(2006.01)
　　　*B01D 29/00*　　　(2006.01)
　　　*B01D 39/20*　　　(2006.01)

(52) U.S. Cl.
　　　CPC ............ *B01D 33/21* (2013.01); *B01D 33/23* (2013.01); *B01D 35/14* (2013.01); *B01D 35/1435* (2013.01); *B01D 39/2068* (2013.01); *B01D 2201/56* (2013.01)

(58) Field of Classification Search
　　　CPC .. B01D 2313/025; B01D 29/05; B01D 29/11; B01D 29/15; B01D 63/082; B01D 63/083; B01D 63/16; B01D 69/02; B01D 71/02; B01D 29/002; B01D 39/2068; B01D 39/0272; B01D 39/2075; B01D 29/2079; B01D 39/2086; B01D 46/0063
　　　See application file for complete search history.

(56) References Cited

U.S. PATENT DOCUMENTS

| | | |
|---|---|---|
| 2005/0284805 A1 | 12/2005 | Hognabba et al. |
| 2008/0087589 A1* | 4/2008 | Grzonka ............. B01D 35/143 210/91 |

* cited by examiner

FILTER PLATE, FILTER DISC APPARATUS, AND A METHOD FOR CONTROLLING A DISC FILTER

CROSS-REFERENCE TO RELATED APPLICATIONS

This is a national stage application filed under 35 USC 371 based on International Application No. PCT/FI2013/050424 filed Apr. 17, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates generally to filter plates and disc filter apparatus which incorporate such filter plates.

BACKGROUND OF THE INVENTION

Filtration is a widely used process whereby a slurry or solid liquid mixture is forced through a media, with the solids retained on the media and the liquid phase passing through. This process is generally well understood in the industry. Examples of filtration types include depth filtration, pressure and vacuum filtration, and gravity and centrifugal filtration.

Both pressure and vacuum filters are used in the dewatering of mineral concentrates. The principal difference between pressure and vacuum filters is the way the driving force for filtration is generated. In pressure filtration, overpressure within the filtration chamber is generated with the help of e.g. a diaphragm, a piston, or external devices, e.g. a feed pump. Consequently, solids are deposited onto the filter medium and filtrate flows through into the filtrate channels. Pressure filters often operate in batch mode because continuous cake discharge is more difficult to achieve.

The cake formation in vacuum filtration is based on generating suction within the filtrate channels. The most commonly used filter media for vacuum filters are filter cloths and coated media, e.g. the ceramic filter medium. Although several types of vacuum filters, ranging from belt filters to drums, exist, only the specifics of rotary vacuum disc filters are included here.

Rotary vacuum disc filters are used for the filtration of relatively free filtering suspensions on a large scale, such as the dewatering of mineral concentrates. The dewatering of mineral concentrates requires large capacity in addition to producing a cake with low moisture content. Such large processes are commonly energy intensive and means to lower the specific energy consumption are needed. The vacuum disc filter may comprise a plurality of filter discs arranged in line co-axially d around a central pipe or shaft. Each filter disc may be formed of a number of individual filter sectors, called filter plates, that are mounted circumferentially in a radial plane around the central pipe or shaft to form the filter disc, and as the shaft is fitted so as to revolve, each filter plate or sector is, in its turn, displaced into a slurry basin and further, as the shaft of rotation revolves, rises out of the basin. When the filter medium is submerged in the slurry basin where, under the influence of the vacuum, the cake forms onto the medium. Once the filter sector or plate comes out of the basin, the pores are emptied as the cake is deliquored for a predetermined time which is essentially limited by the rotation speed of the disc. The cake can be discharged by a back-pulse of air or by scraping, after which the cycle begins again. Whereas the use of a cloth filter medium requires heavy duty vacuum pumps, due to vacuum losses through the cloth during cake deliquoring, the ceramic filter medium, when wetted, does not allow air to pass through which does not allow air to pass through, which further decreases the necessary vacuum level, enables the use of smaller vacuum pumps and, consequently, yields significant energy savings.

The filter plate is affected by slurry particles and extraneous compounds, especially in the field of dewatering of mineral concentrates, and as the replacement of a plate can be expensive, the regeneration of the filter medium becomes a critical factor when the time-in-operation of an individual filter plate needs to be increased. The filter medium is periodically regenerated with the use of one or more of three different methods, for example: (1) backwashing, (2) ultrasonic cleaning, and (3) acid washing. Whereas the regenerative effect of backwashing and ultrasound are more or less mechanical, regeneration with acids is based on chemistry. As another benefit of a ceramic filter medium, the ceramic filter plate is mechanically and chemically more durable than, for example, filter cloths and can, thus, withstand harsh operating conditions and possible regeneration better than other types of filter media. These attributes allow for chemical regeneration of the filter plates with acids, whereas a cloth would have to be discarded, after being blinded by particles, and replaced several times during a year's operation.

Filter plate breakages happen once a while in operation when the filter plates are old, something gets stuck to scrapers or for some other reason. There is a significant risk that breakage of one plate causes domino effect as the pieces of the broken plate may break neighbouring filter plates etc, which may lead to a massive "plate salad" of broken plates, and the filter is out of operation for many days. In the worst case the "plate salad" might cost hundreds of thousands of dollars for the user due to cost of the filter plates and the shutdown time of the process.

BRIEF DESCRIPTION OF THE INVENTION

An object of the present invention is to mitigate the problems relating to the breakage of filter plate. The object of the invention is achieved by a filter plate, an apparatus and method according to the independent claims. The preferred embodiments of the invention are disclosed in the dependent claims.

An aspect of the invention is a filter plate, comprising
a porous ceramic substrate,
a porous ceramic membrane layer on an outer surface of the ceramis substrate, and
at least one conductive wiring extending along the filter plate to form a continuous electrical circuit and arranged to break upon breakage of the filter plate.

In an embodiment, the filter plate comprises the at least one conductive wiring between ceramic substrate and the ceramic membrane layer.

In an embodiment, the filter plate comprises the at least one conductive wiring extending along the outer surface of filter plate, preferably along the peripheral edge surface of the filter plate.

In an embodiment, the filter plate comprises the at least one conductive wiring on both sides of the filter plate.

In an embodiment, the at least one conductive wiring is of acid-proof material, preferably platinum or palladium composition.

In an embodiment, the at least one conductive wiring is of non-acid-proof material provided with an acid-proof coating.

In an embodiment, the filter plate comprises a connector device connected to the at least one conductive wiring and connectable to an external connector.

In an embodiment, the connector device comprises contacts on at least one surface pressed against the at least one conductive wiring on the filter plate, the connector device being secured to the filter plate and sealed by glue or corresponding material, and the connector device further comprising a connector part compatible with an external connector.

In an embodiment, the connector device comprises a fork-shaped body having legs with said contacts on at least one opposite internal surfaces of the legs pressed against the at least one conductive wiring on the filter plate mounted between the legs, the base of the fork-shaped body protruding from the edge of the filter plate and being provided with said connector part.

Another aspect of the invention is a disc filter apparatus, particularly a capillary action disc filter, and, comprising consecutive co-axial filter discs with sectors formed by a plurality of sector-shaped filter plates according to any one of claims 1-9, and a controller configured to monitor an integrity of the conductive wirings of the plurality of the filter plates and to provide a break indication signal in response to detecting a break of the conductive wirings.

In an embodiment, the controller is arranged to monitor the integrity of a series-connection of the conductive wirings of two or more filter plates.

In an embodiment, the conductive wirings of the filter plates of a same sector of the consecutive co-axial filter discs are series-connected, so that the number of series connections corresponds to the number of sectors of one filter disc.

In an embodiment, the apparatus comprises a position sensor, preferably an inclinometer, providing position data on the sector of the consecutive co-axial filter discs where the break is located.

In an embodiment, the controller is arranged in a rotating part of the disc filter apparatus, and the apparatus comprising an inductive power transfer unit arranged to energize the controller from a stationary part of the apparatus by means of an inductive power transmission.

In an embodiment, the controller is arranged in a rotating part of the disc filter apparatus, and the apparatus comprising a wireless, preferably inductive, signal transfer unit arranged to transfer signals from the controller to a stationary part of the apparatus.

A further aspect of the invention is a method for controlling a for a disc filter, particularly a capillary action disc filter, comprising consecutive coaxial filter discs with sectors formed by a plurality of filter plates, the method comprising
monitoring an integrity of conductive wirings provided in said the plurality of the filter plates,
stopping operation of the disc filter in response to detecting a break of one or more of the conductive wirings.

In an embodiment, the method comprises monitoring the integrity of a series-connection of the conductive wirings of two or more filter plates.

In an embodiment, the method comprises determining the sector of the consecutive co-axial filter discs where the break is located based on an angular position of the discs at the time of detecting a break of one or more of the conductive wirings.

In an embodiment, the method comprises inductively transferring an electric power from a stationary part of the disc filter to a rotating part of the disc filter.

In an embodiment, the method comprises
wirelessly transmitting information about the detected break from a rotating part of the disc filter to a stationary part of the disc filter, and
stopping the disc filter by a control unit on the stationary part of the disc filter.

BRIEF DESCRIPTION OF THE SEVERAL VIEWS OF THE DRAWINGS

In the following the invention will be described in greater detail by means of example embodiments with reference to the accompanying drawings, in which.

DESCRIPTION OF EXEMPLARY EMBODIMENTS

Principles of the invention can be applied for drying or dewatering fluid materials in any industrial processes, particularly in mineral and mining industries. In embodiments described herein, a material to be filtered is referred to as a slurry, but embodiments of the invention are not intended to be restricted to this type of fluid material. The slurry may have high solids concentration, e.g. base metal concentrates, iron ore, chromite, ferrochrome, copper, gold, cobalt, nickel, zinc, lead and pyrite.

Figure 1:
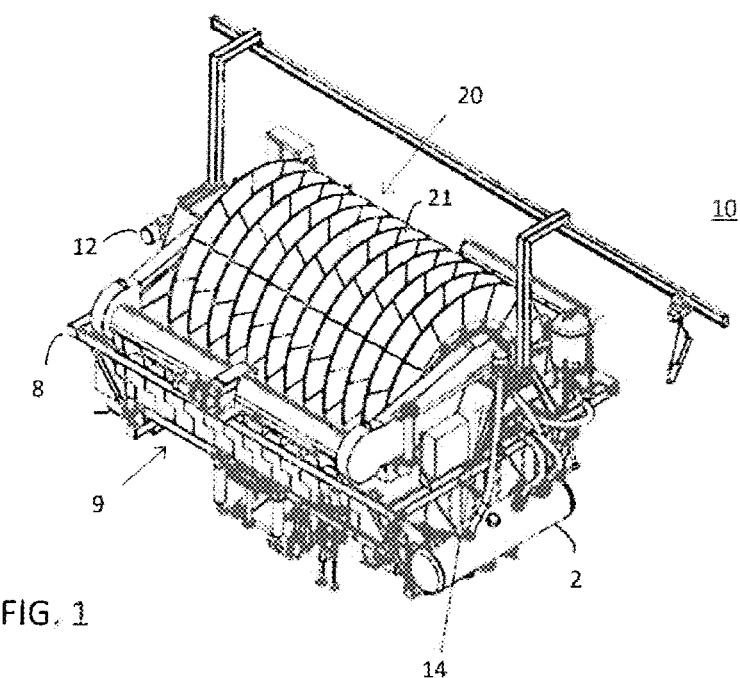
FIG. 1 is a perspective top view illustrating an exemplary disc filter apparatus, wherein embodiments of the invention may be applied.
Figure 2:
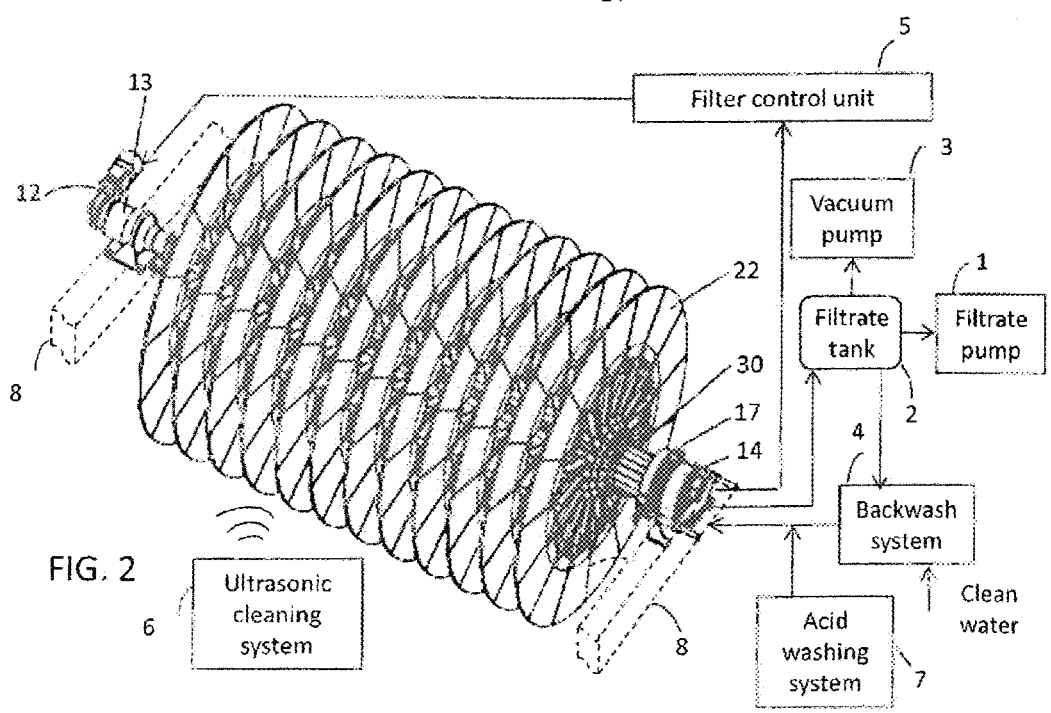
FIG. 2 is a perspective top view illustrating an exemplary drum, wherein embodiments of the invention may be applied.

FIGS. 1 and 2 are perspective top views illustrating an exemplary disc filter apparatus and an exemplary drum 20, respectively, in which embodiments of the invention may be applied. The exemplary disc filter apparatus 10 comprises a cylindrical-shaped drum 20 that is supported by bearings 13 and 17 on a frame 8 and rotatable about the longitudial axis of the drum 20 such that the lower portion of the drum is submerged in a slurry basin 9 located below the drum 20. A drum drive 12 is provided (such as an electric motor, a gear box,) is provided for rotating the drum 20. The drum 20 comprises a plurality of ceramic filter discs 21 arranged in line co-axially around the central axis of the drum 20. The number of the ceramic filter discs may range from 2 to 20, for example. The diameter of each disc 21 may ce large, ranging from 1.5 m to 4 m, for example. Examples of commercially available disc filters wherein in which embodiments of the invention may be applied, include Ceramec CC filters, models CC-6, CC-15, CC-30, CC-45, CC-60, CC-96 and CC-144 manufactured by Outotec Inc.

Figure 3:
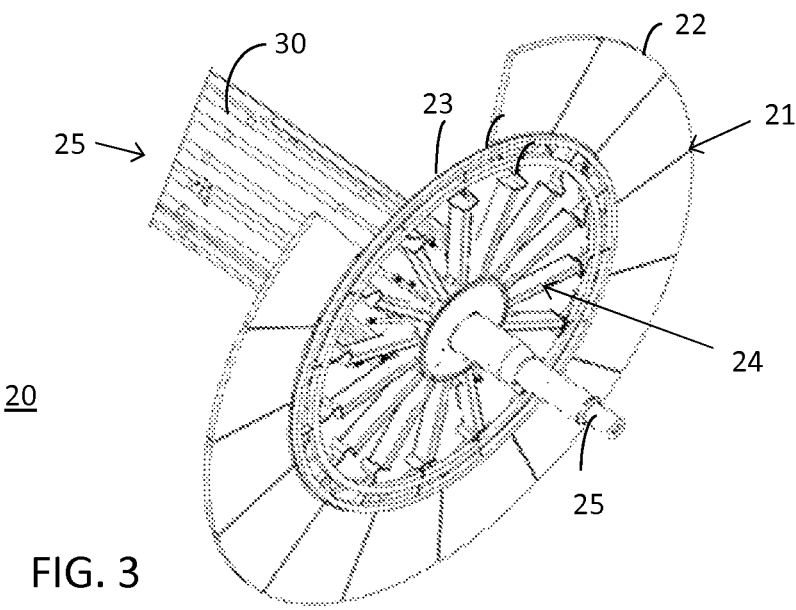
FIG. 3 is a perspective cutaway diagram illustrating details of an exemplary drum.
Figure 4:
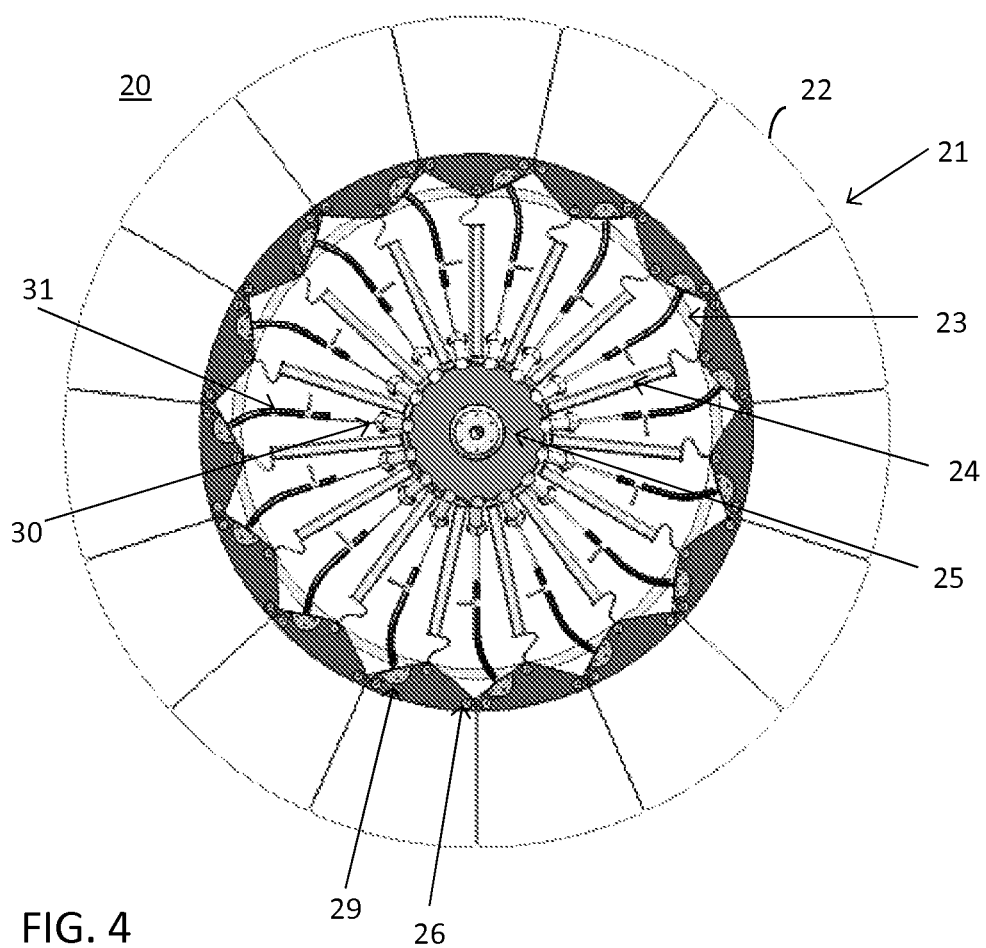
FIG. 4 is a front view illustrating details of an exemplary drum.
Figure 5:
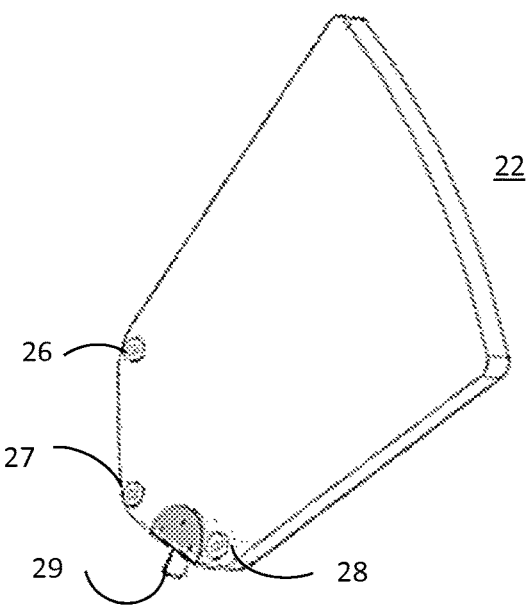
FIG. 5 is a perspective top view of an exemplary sector-shaped ceramic filter plate.

FIG. 3 is a perspective cutaway diagram and FIG. 4 is a front view illustrating details of an exemplary drum 20 wherein embodiments of the invention may be applied. FIG. 5 is a perspective top view of an exemplary sector-shaped ceramic filter plate 22. In FIGS. 3 and 4, only one of the plurality of filter discs 21 is shown, but the other filter discs in the disc row can be preferably essentially similar in structure as can be seen in FIGS. 1 and 2. Each filter disc 22 may be formed of a number of individual sector-shaped ceramic filter elements, called filter plates 22, that are mounted circumferentially in a radial planar plane around the central axis of the drum to form an essentially continuous and planar disc surface. The number of the filter plates may be 12 or 15, for example. The filter plate 22 may be provided with mounting parts, such as fastening openings 26, 27 and 28 which function as means for attaching the plate 22 to mounting means in the drum. In example embodiments shown in FIGS. 3 and 4 the filter plates 22 may be assembled on a round rim structure 23 that can be mounted on a central sylinder or shaft 25 by means of radial spokes 24a (similar to a spoke wheel). The rim structure 23 may have holes or other means in which the mounting parts 26, 27 and 28 of the filter plates 22 can be attached. The filter plate 22 may also be provided with mounting part 29, such as a tube connector 29, which functions as means for providing the internal fluid duct of the filter plate 22 with a fluid connection with a collector piping 30 in the drum. In example embodiments shown in FIGS. 3 and 4 each filter plate 22 is connected to collector piping 30 with hoses 31. In exemplary embodiments the filter plates 22 are disposed in rows and there may be a number of collector pipes 30 the longitudinal direction of the drum, the task of which is to connect the filter plates that are disposed in the same row; i.e. there may be as many collector pipes 30 as there are rows of filter plates 3 (preferably one collector pipe 30 for each sector of the filter disc 21). As illustrated in FIG. 2, the collector pipes 30 may be connected to a distributing valve 14 disposed on the axis of the filter, the task of which distributing valve 14 is to transmit the partial vacuum or overpressure to the filter plates 22. The distributing valve 14 may comprise zones such that a part of the filter plates 22 contain a partial vacuum (in this case there is cake formation and cake drying) or overpressure (in which case cleaning of the filter elements with water or filtrate is performed with reverse pressure). If a long drum is used, it can be advantageous to dispose the distributing valve at both ends of the drum. A vacuum system may be provided that may comprise a filtrate tank 2 and a vacuum pump 3 and a filtrate pump 1. The vacuum pump 3 maintains a partial vacuum in the piping 30 of the filter and the filtrate pump 1 removes the filtrate. It is possible to arrange reverse flushing or backwash either such that some of the filtrate or clean water from an external water source is led back to the filter piping by means of a backwash system, such as a backwash pump. The filter plates 22 may be periodically regenerated with the use of one or more of three different methods, for example: backwashing 4, ultrasonic cleaning 6, and acid washing 7. Operation of the disc filter may be controlled by a filter control unit 5, such as a Programmable Logic Controller, PLC.

Figures 6A, 6B, 6C:
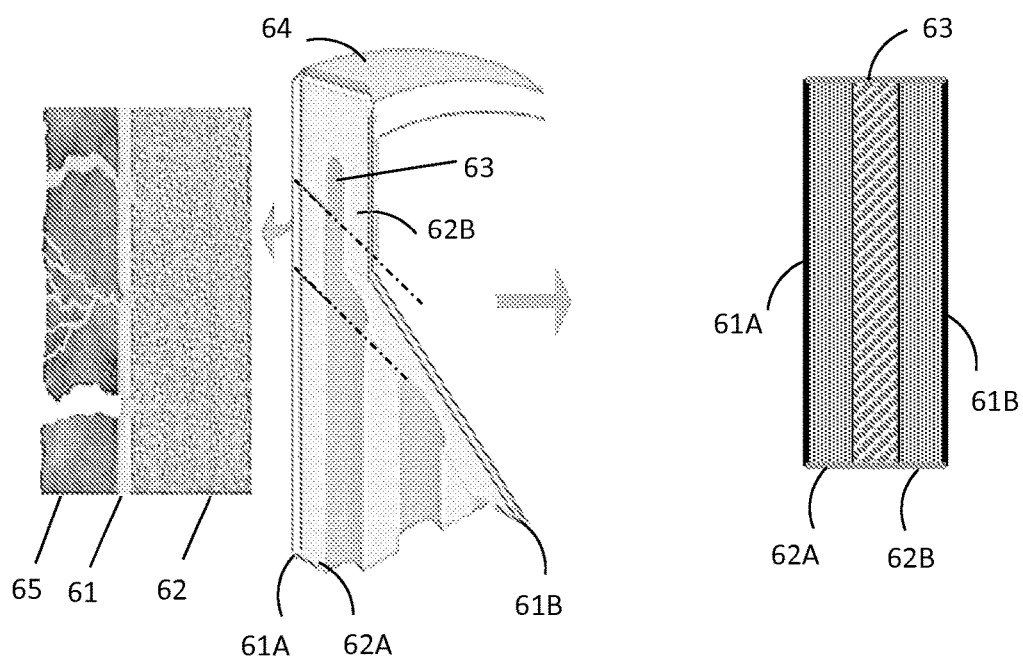
FIGS. 6A, 6B and 6C illustrate exemplary structures of a ceramic filter plate wherein embodiments of the invention may be applied.

FIGS. 6A, 6B and 6C illustrate exemplary structures of a ceramic filter plate wherein embodiments of the invention may be applied. A microporous filter plate 22 may comprises a first suction wall 61A, 62A and an opposed second suction wall 61B, 62B. The first suction wall comprises a microporous membrane 61A and a microporous substrate 62A, whereon the membrane 61A is positioned. Similarly, the second suction wall comprises a microporous membrane 61B and a microporous substrate 62B. An interior space 63 is defined between the opposed first and second suction walls 61A, 62A and 61B, 62B resulting in a sandwich structure. The interior space 63 is provides a flow canal or canals which will have a flow connection with collecting pipe 30 in the drum 20 through the connecting means 29 and the hose 31. When the collecting pipe 30 is connected to a vacuum pump, the interior 63 of the filter plate 22 is maintained at a negative pressure, i.e. a pressure difference is maintained over the suction wall. The membrane 61 contains micropores that create strong capillary action in contact with water. This microporous filter medium allows only liquid to flow through. Filtrate is drawn through the ceramic plate 22 as it is immersed into the slurry basin 9, and a cake 65 forms on the surface of the plate 22. The liquid or filtrate into the central interior space 63 is then transferred along the tube 31 into the collecting pipe and further out of the drum 20. The interior space 63 may be an open space or it may be filled with a granular material which acts as a reinforcement for the structure of the plate. Due to its granular nature, the material does not prevent the flow of liquid that enters into the central interior space 63 since the granular material does not present a major resistance to liquid flow. The interior space 63 may further comprise supporting elements or partition walls to further reinforce the structure of the plate 22. The edges 64 of the plate may be reinforced by means of glazing.

Figure 7A:
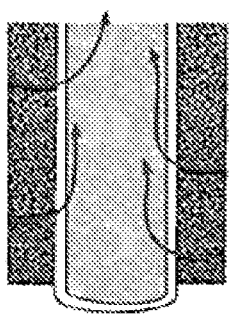
FIGS. 7A, 7B, 7C, 7D and 7E illustrate different phases of a filtering process.
Figure 7B:
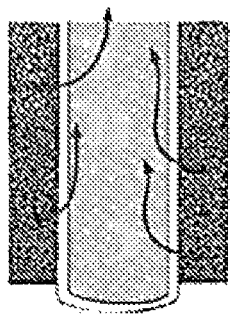
Figure 7C:
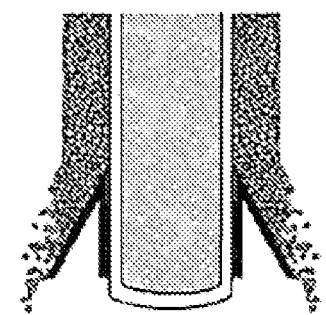
Figure 7D:
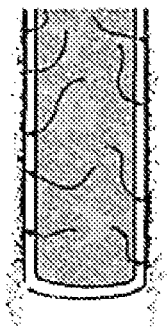
Figure 7E:
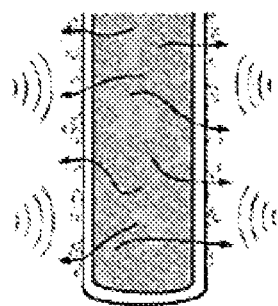

As the row of the filter discs 21 rotate, the plates 22 of the each disc 21 move into and through the basin 9. Thus, each filter plate 22 goes through four different process phases or sectors during one rotation of the disc 21. In a cake forming phase, the liquid is passing through the plate 22 when it travels through the slurry, and a cake is formed on the plate surface, as illustrated in FIG. 7A. The plate 22 enters the cake drying phase (illustrated in FIG. 7B) after it leaves the basin 9. If cake washing is required, it is done in the beginning of the drying phase. In the cake discharge phase illustrated in FIG. 7C the cake is scraped off by ceramic scrapers so that a thin cake is left on the plate 22 (gap between the scraper and the plate 22). In the backflush (backwash) phase of sector of each rotation, water (filtrate) is pumped in a reverse direction through the plate, as illustrated in FIG. 7D. The backflush water washes off the residual cake and cleans the pores of the filter plate. Proper backflush is important for the filter operation. Backflush pressure may range from about 0.9 bar up to 2.5 bar, for example, depending on the application and the size of the filter discs. As illustrated in FIG. 7E, the filter plate 22 is also periodically regenerated with the use of one or more of three different methods, for example: (1) backwashing, (2) ultrasonic cleaning, and (3) acid washing. A combined wash (acid and ultrasonic) is most effective. Typical acids used in the acid washing include nitric acid and oxalic acid. The regeneration may be performed 1 . . . 3 times per day, for example. The regenation time may typically be 40 . . . 60 minutes, for example.

Filter plate breakages happen once a while in operation when the filter plates are old, something gets stuck to scrapers or for some other reason. There is a significant risk that breakage of one plate causes domino effect as the pieces of the broken plate may break neighbouring filter plates etc, which may lead to massive "plate salad" of broken plates, and filters is out of operation for many days.

According to an aspect of the invention, the filter plate is provided with at least one conductive wiring extending along the filter plate to form a continuous electrical circuit and arranged to break upon breakage of the filter plate. The integrity of the conductive wiring is monitored, and the operation, particularly the rotation, of the disc filter is immediately stopped in response to detecting a break of one of the conductive wirings. This action will advantageously save all the other plates of the disc filter from getting broken. Operation downtime decreases as the "plate salad" of several broken plates is avoided and the operator of the disc filter can concentrate on displacing the broken plate. The number of broken consumed filter plates decreases which results in lower operational costs.

Figure 8A:
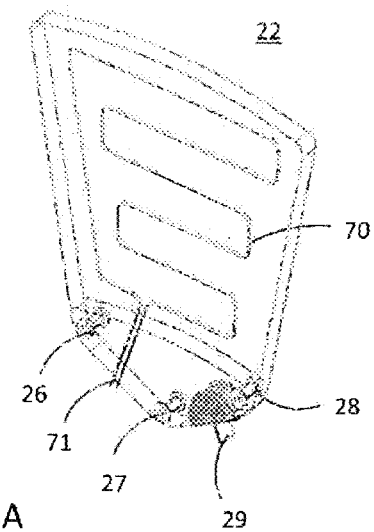
FIGS. 8A and 8B illustrate filter plates according to exemplary embodiments of the invention.

A filter plate according to an exemplary embodiment of the invention is illustrated in FIG. 8A. The structure and operation of the filter plate 22 may be substantially similar to those of the filter plates 22 discussed above, except that the filter plate is provided with an electrically conductive wiring 70. The conductive wiring 70 creates a continuous circuit loop with ends of the loop at the connector 71 that may be provide at the lower part of the filter plate 22. If the conductive wiring 70 breaks at any part of the plate 22 also the circuit loop gets broken or disconnected. The connector 71 is intended for connecting the conductive wiring 70 the cabling arranged in the drum 20 to inter-connect plates and a sensor controller. The conductive wiring 70 is adapted to break if the body of filter plate 22 breaks, so that the break of the circuit loop will indicate the breakage of the plate 22. The conductive wiring 70 may have any wiring pattern that enables a desired detection of breakage in different parts of the filter plate 22 but does not unnecessary disturb the filtering function of the plate. Advantageously there are conductive wirings 70 on both sides of the filter plate 22, which wirings 70 are series-connected at the connector 71 to form a single circuit loop.

The electric wiring 70 may comprise a printed electric wire, a casted electric wire, a microstrip line, separate electric wire, a metal tape or a painted electric circuit, for example.

The filter plate is subjected to acid environment, when the acid washing is used for recovery. Therefore, the conductive wiring 70 is preferably made of acid-proof material or provided with an acid-proof coating. Platinum or palladium or compositions thereof are especially advantageous materials for implementing acid-proof wiring. Other metals, such as copper and aluminium, are examples of conductive materials that are not acid-proof.

In an embodiment, the conductive wiring 70 is provided between ceramic substrate 62 and the ceramic membrane 61 (see FIGS. 6A-6C), preferably on the both sides of the filter plate. In this case the membrane 61 protects the wiring 70 against the direct mechanical and chemical stress from the from the process environment. However, as the acid flows through substrate 62 and the membrane 61 during the acid washing, also the conductive wiring 70 is subjected to the acid. Therefore, the wiring is preferably made of acid-proof material, advantageously of platinum or palladium. The wiring may be manufactured by, for example, applying (preferably printing) a pattern of conductive paste on the outer surface of the substrate 62 prior to making the membrane layer 61. This approach can also detect a stripping of the membrane prior to an actual breakage of the substrate. This approach may be especially suitable for large filter plates.

In an embodiment, a conductive wiring is arranged extend on the outer surface of the membrane 61 of the filter plate 22. In that case additional protecting covering may be required against the direct mechanical and chemical stress from the from the process environment.

Figure 8B:
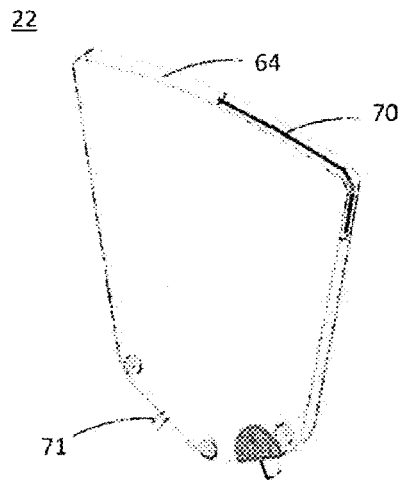

In an embodiment, the conductive wiring 70 is provided along the peripheral edge surface 64 of the filter plate 22 as illustrated in FIG. 8B. The peripheral edge surface 64 of the filter plate 22 is not normally involved with the filtering function, and therefore the conductive wiring 70 can be coated with an acid-proof coating, such as epoxy based painting or enamel, without affecting to the filtering operation. As result, cheaper materials (such as copper tape) which are not acid-proof can be used for the conductive wiring 70. This approach may be especially suitable for smaller filter plates.

In an embodiment, the conductive wirings of two or more filter plates 22 are series-connected to form a single electric circuit loop. As a result, number of circuit loops to be monitored and amount of wiring required in the drum 20 is reduced.

Figure 8C:
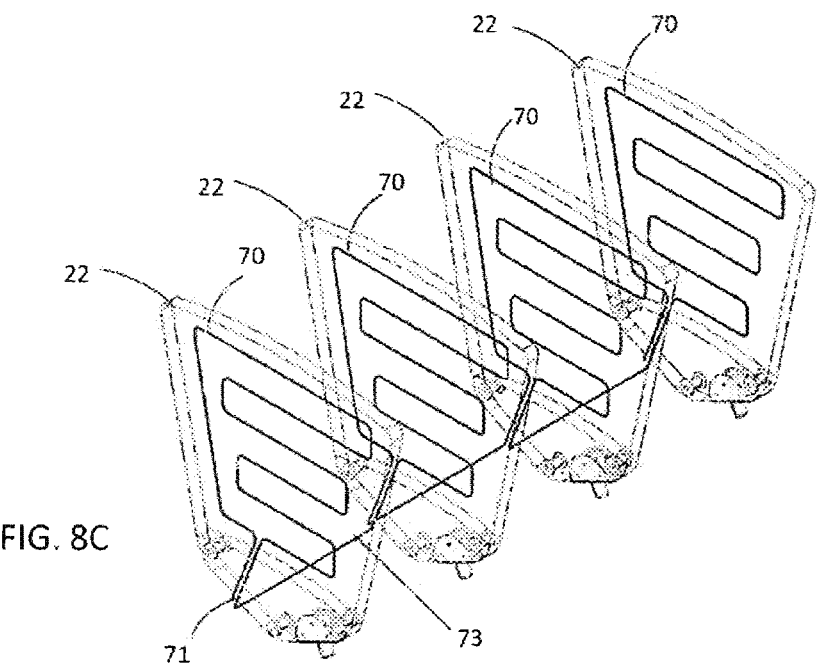
FIG. 8C illustrates a series-connection filter plates according to an exemplary embodiment of the invention.

In an embodiment, the conductive wirings 70 of the filter plates 22 of a same sector of the consecutive co-axial filter discs 21 are series-connected to form a single electric circuit loop as illustrated in FIG. 8C. Line 73 represents the wire arranged along the cylinder of the drum 20 for interconnecting the consecutive plates. Thus, the number of series connections or circuit loops corresponds to the number of sectors of one filter disc 21. For example, the number of sectors in one filter disc 21 may be 12 or 15, whereas total number of plates 22 in all discs 21 may be 144 or 180. The distant end of the series connection may be connected to a predetermined potential, such as ground potential in which case no separate return wires of loops will be needed.

According to an aspect of the invention, the filter plate 22 comprises a connector device 71 connected to the conductive wiring 70 and connectable to an external connector. The connector 71 may be attached to the plate 22, or it may be separate from the plate 22 and connected to the wiring 70 with a length of wires which may be soldered to the wiring 70. However, attaching the connector to the plate or soldering is typically additional manufacturing step which is quite different from the normal manufacturing steps of a filter plate. Attaching should be as simple as possible. Moreover, also the connector 71 is subject to and should resist the harsh acid process environment which sets special requirements to the attaching and connecting techniques as well as to materials of the connector.

In an embodiment, a connector device comprises contacts on at least one connector surface pressed against the conductive wiring(s) on the filter plate 22. The connector device is secured to the filter plate and sealed by glue or corresponding material. The connector device further comprises a connector part compatible with an external connector.

Figure 9A:
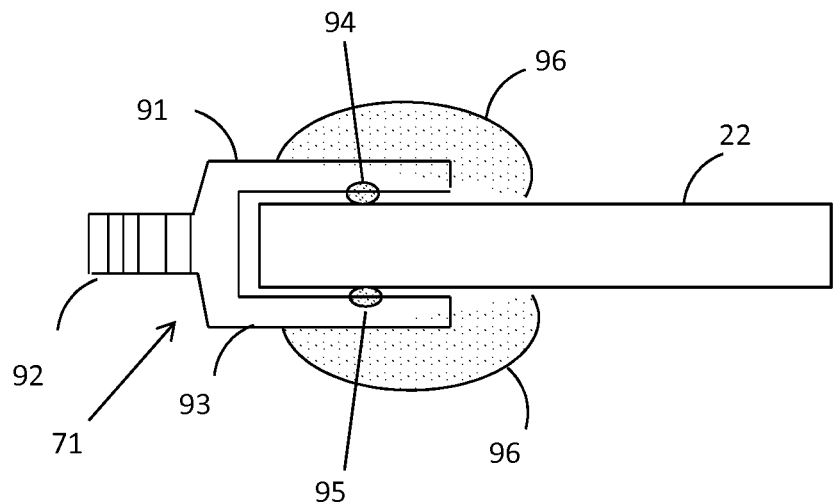
FIGS. 9A and 9B show a cross-sectional side view and a top view illustrating a plate connector according to an exemplary embodiment of the invention.
Figure 9B:
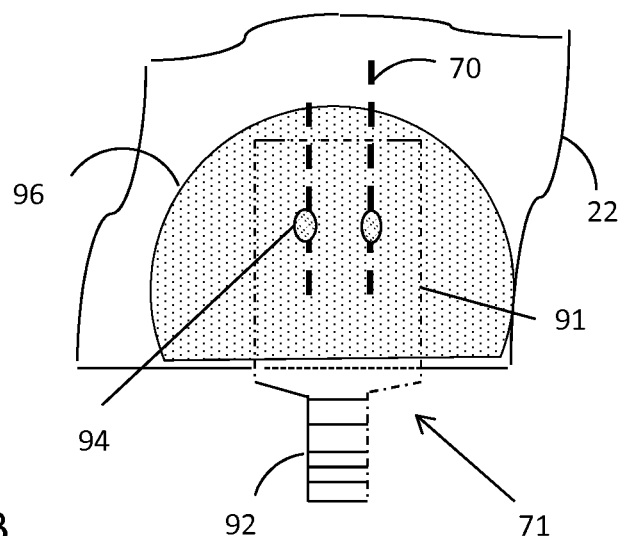

According to a further embodiment illustrated in FIGS. 9A and 9B, the connector device 71 comprises a fork-shaped body having legs 91 and 93 with the contacts 94, 95 on at least one of the opposite internal surfaces of the legs pressed against the conductive wiring 70 on the filter plate 22 mounted between the legs 91 and 93. The legs 91 and 93 preferably have a spring action which presses the legs against the filter plate when the connector 71 is inserted at the edge of the plate 22. The connector 71 may then be secured to the filter plate 22 and sealed by glue or corresponding material 96. As a result, the manufacturing steps for mounting the connector are simple and fast. The glue 96 also protects the connector 71 and the contacts 92 from the harsh process environment. However, the contacts 94, 95 are preferably of acid-proof material, more preferably stainless steel. The base 92 of the fork-shaped body that protrudes from the edge of the filter plate 22 is provided with a connector part compatible with an external connector. In the example illustrated the connector part is a threaded female connector.

Figure 10:
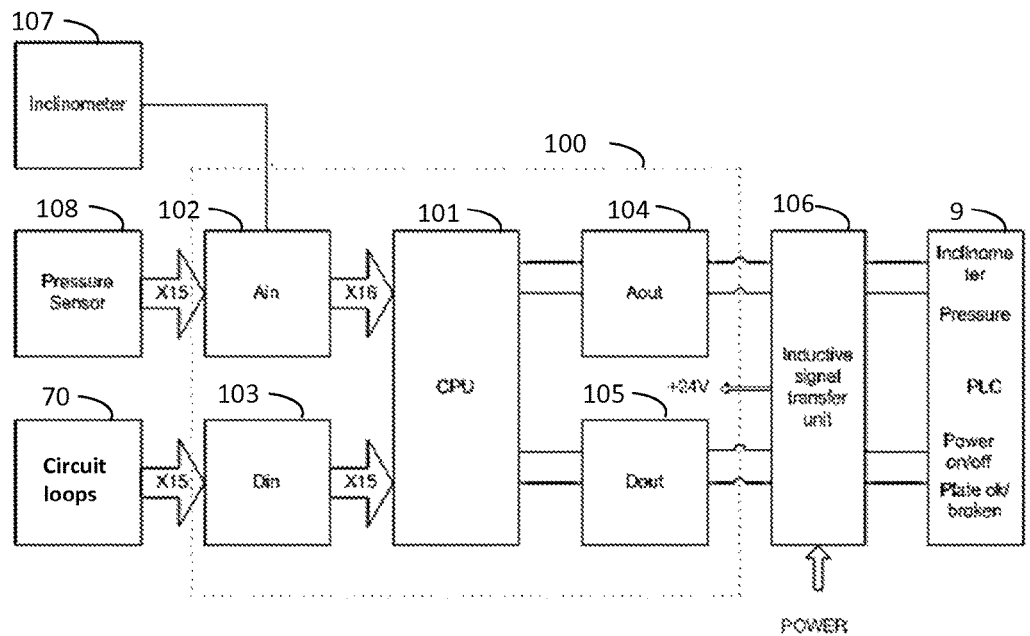
FIG. 10 is a block diagram illustrating a sensor control unit according to an exemplary embodiment of the invention.

In an embodiment the drum 20 of the disc filter is provided with a sensor control unit configured to monitor the circuit loops provided by the wirings 70 in the filter plates 22. FIG. 10 is a block diagram illustrating an exemplary sensor control unit 100 and its connections to sensors on the drum and to the filter control unit 5 in the stationary part of the disc filter. The sensor controller 100 may comprise a processor (CPU) 101 with a memory configured to store program code and dynamic data. For example, the processor 101 may be a C-programmable micro controller. The circuit loops formed by the wirings 70 of the plates 22 may be connected to an input and digitizer unit 103 that measures the integrity of each circuit loop. For example, a voltage measured over the circuit loop is low, when the circuit loop is unbroken (short circuited), whereas the voltage measured over a broken circuit loop (open circuit) is high. In other words, an unbroken circuit loop may connect the corresponding input to a ground potential, whereas in case of a broken (open) circuit loop the respective input is drawn to the supply voltage. Similarly, any other quantity, such as a loop current, may be measured, to determine the integrity of the circuit loop, as is obvious for a person skilled in the art. In the exemplary controller, the conductive wirings 70 of the filter plates 22 of a same sector of the consecutive co-axial filter discs 21 are series-connected to form a single electric circuit loop, thereby the input unit 103 monitors 15 circuit loops (number of sectors being 15). Digitized inputs corresponding to the 15 measurement results are applied to the processor CPU 101. The input unit 103 may be a multiplexer type unit so that the processor 101 may read one circuit loop at time. If all circuit loops are unbroken, the processor 101 outputs a "plate ok" indication (e.g. digital out "low") or no indication through a digital output unit 105 to the disc filter controller 9. If any of the circuit loops is broken, the processor 101 outputs a corresponding "plate broken" indication (e.g. digital out "high") through the digital output unit 105 to the disc filter controller 9, which immediately stops the rotation of the drum 20 (e.g. by controlling the disc drive 12).

In an embodiment, a position sensor 107, preferably an inclinometer, may be provided on the shaft or cylinder 25 of the drum 20 to detect the sector of the consecutive co-axial filter discs where the break is located, based on an angular position of the discs 21 at the time of detecting a break of the conductive wirings 70. The output current 4-20 mA from the inclinometer 107 corresponds to the position (0-360 degrees) of the drum 20. The inclinometer output current may be received at a current input unit 102 that may provide a digitized inclinometer current value for the processor 101. When a broken circuit loop (filter plate) is detected and a "plate broken" signal is outputted through the output unit 105, the processor 101 may output an inclinometer signal through an output unit 104, the inclinometer signal indicating the disc sector in which the broken plate is located. This information may be displayed or otherwise indicated to an operator of the disc filter. Thus, the operator can search the broken plate from a specific row of the filter plates instead of searching all plates.

In embodiments, the drum 20 may comprise further sensors, such pressure sensors 108 that may also be connected to the input unit 102 or 103 and read by the processor 101. The processor 101 may forward the further sensor information, such as pressure data, through the output unit 104 or 105 to the disc filter controller 9.

In an embodiment, the disc filter comprises an inductive power transfer unit 106 arranged to energize the sensor controller 100 of the drum 20 from a stationary part of the disc filter by means of an inductive power transmission. As result, no additional power source, such as a battery, is required in the drum 20.

In an embodiment, the inductive power transfer unit 106 comprises an inductive transmitter on the drum side and an inductive receiver on the stationary part of the disc filter to inductively transfer signals from the sensor controller 100 to the stationary part of the disc filter.

In an embodiment, wireless radio transmitter or other kind of wireless transmission medium is employed to transfer signals from the sensor controller 100 to a stationary part of the disc filter.

In an embodiment, a galvanic connection is employed to transfer signals from the sensor controller 100 to a stationary part of the disc filter.

Figure 11:
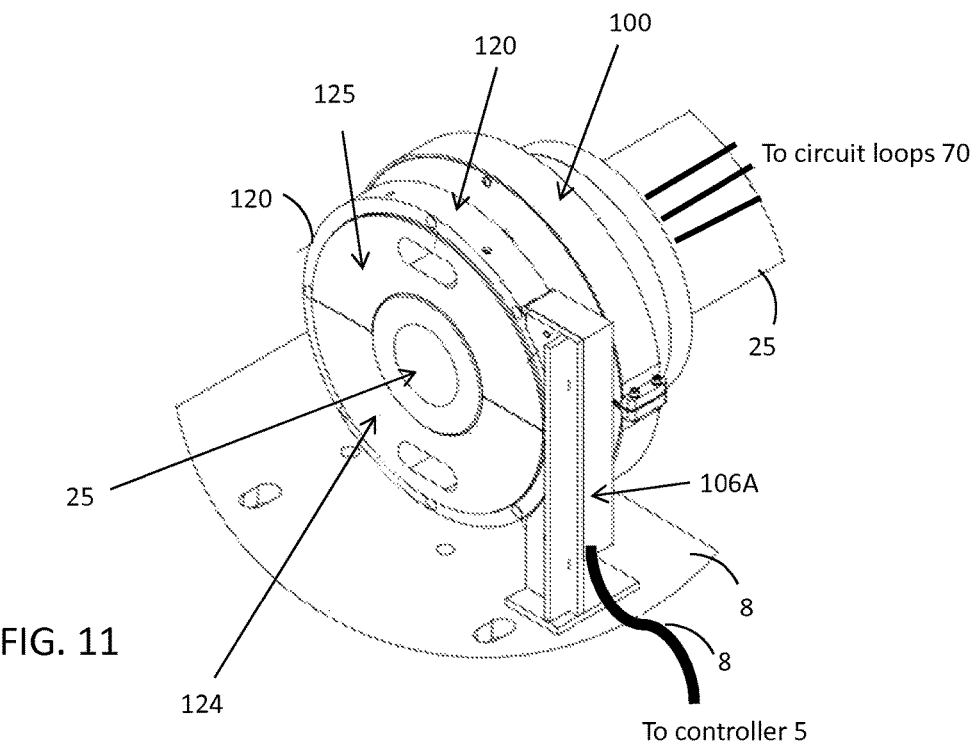
FIG. 11 is a perspective top view illustrating an inductive power and signal transfer unit according to an exemplary embodiment of the invention.

In an embodiment, the inductive power and signal transfer unit 106 comprises an inductive slip ring 120 is attached to the frame 8 of the disc filter, and a pair of inductive half-rings 124 and 125 attached to around the shaft 25 of the drum 25, as illustrated in FIG. 11. The slip ring 120 may contain a permanent magnet. The semi-rings 124 and 125 may each comprise a coil connected to a power supply of the sensor controller 100 within a ring-shaped housing attached around the shaft 25. When the semi-rings 124 and 125 rotate within the slip ring 120, a current is induced in the coils for the power supply which generates a supply voltage for the controller unit 100 and possible other electric circuitry in the drum. The coil of the semi-ring 124 and the coil of the semi-ring 125 may operate as inductive transmitters for signals from the output unit 104 and the output unit 105, respectively. When a signal is outputted from the output unit to the coil of the semi-ring 124, the current in the transmitter coil is modulated accordingly, which can be detected by a receiver coil in an inductive receiver 106A provided on the slip ring 120. The inductive receiver 120 may forward the signal further to the disc filter controller 5 over a cable or like. Similarly, a signal is outputted from the output unit to the transmitter coil of the semi-ring 124 modulates the current in the coil accordingly, which can be detected by the inductive receiver 106A. Thus, using the semi-rings 124 and 125, a two-channel inductive signal transfer can be implemented.

Upon reading the present application, it will be obvious to a person skilled in the art that the inventive concept can be implemented in various ways. The invention and its embodiments are not limited to the examples described above but may vary within the scope of the claims.

The invention claimed is:

1. A filter plate, comprising
a porous ceramic substrate,
a porous ceramic membrane layer on an outer surface of the ceramic substrate, and
at least one conductive wiring extending along the filter plate to form a continuous electrical circuit and arranged to break upon breakage of the filter plate, wherein the conductive wiring is provided along a peripheral edge surface of the filter plate, the peripheral edge surface interconnecting outer ends of a pair of opposed faces of the filter plate.

2. A filter plate according to claim 1, wherein the at least one conductive wiring is of acid-proof material.

3. A filter plate according to claim 1, wherein the at least one conductive wiring is of non-acid-proof material provided with an acid-proof coating.

4. A filter plate according to claim 1, comprising a connector device connected to the at least one conductive wiring and connectable to an external connector.

5. A filter plate according to claim 4, wherein the connector device comprises contacts on at least one surface pressed against the at least one conductive wiring on the filter plate, the connector device being secured to the filter plate and sealed, and the connector device further comprising a connector part compatible with an external connector.

6. A filter plate according to claim 5, wherein the connector device comprises a fork-shaped body having legs with said contacts on at least one opposite internal surfaces of the legs pressed against the at least one conductive wiring on the filter plate mounted between the legs, the base of the fork-shaped body protruding from the edge of the filter plate and being provided with said connector part.

7. A disc filter apparatus, particularly a capillary action disc filter, comprising: consecutive co-axial filter discs with sectors formed by a plurality of sector-shaped filter plates according to claim 1, and a controller configured to monitor an integrity of the conductive wirings of the plurality of the filter plates and to provide a break indication signal in response to detecting a break of the conductive wirings.

8. An apparatus according to claim 7, wherein the controller is arranged to monitor the integrity of a series-connection of the conductive wirings of two or more filter plates.

9. An apparatus according to claim 8, wherein the conductive wirings of the filter plates of a same sector of the consecutive co-axial filter discs are series-connected, so that the number of series connections correspond to the number of sectors of one filter disc.

10. An apparatus according to claim 7, comprising a position sensor providing position data on the sector of the consecutive co-axial filter discs where the break is located.

11. An apparatus according to claim 7, wherein the controller is arranged in a rotating part of the disc filter apparatus, and the apparatus comprising an inductive power transfer unit arranged to energize the controller from a stationary part of the apparatus by means of an inductive power transmission.

12. An apparatus according to claim 7, wherein the controller is arranged in a rotating part of the disc filter apparatus, and the apparatus comprising a wireless signal transfer unit arranged to transfer signals from the controller to a stationary part of the apparatus.

13. A method for controlling a disc filter, comprising consecutive co-axial filter discs with sectors formed by a plurality of filter plates, the method comprising:
monitoring an integrity of conductive wirings provided in said the plurality of the filter plates, where the conductive wirings are provided along a peripheral edge surface of each filter plate, each peripheral edge surface interconnecting outer ends of a pair of opposed faces of each filter plate, and,
stopping operation of the disc filter in response to detecting a break of one or more of the conductive wirings.

14. A method according to claim 13, comprising monitoring the integrity of a series-connection of the conductive wirings of two or more filter plates.

15. A method according to claim 13, comprising determining the sector of the consecutive co-axial filter discs where the break is located based on an angular position of the discs at the time of detecting a break of one or more of the conductive wirings.

16. A method according to claim 13, comprising inductively transferring an electric power from a stationary part of the disc filter to a rotating part of the disc filter.

17. A method according to claim 13, comprising
wirelessly transmitting information about the detected break from a rotating part of the disc filter to a stationary part of the disc filter, and
stopping the disc filter by a control unit on the stationary part of the disc filter.

* * * * *